United States Patent [19]
Brown et al.

[11] 3,725,429
[45] Apr. 3, 1973

[54] BENZAMIDOIMIDAZOLINES

[75] Inventors: David Maxwell Brown, Dorking; Eric Alfred Watts, Harlow, both of England

[73] Assignee: Beecham Group Limited, Brentford, Middlesex, England

[22] Filed: Nov. 12, 1970

[21] Appl. No.: 88,978

[30] Foreign Application Priority Data

Nov. 18, 1969 Great Britain..................56,271/69

[52] U.S. Cl..........260/309.6, 260/552 R, 260/558 S, 260/559 T, 260/999
[51] Int. Cl..............................................C07d 49/34
[58] Field of Search....................................260/309.6

[56] References Cited

OTHER PUBLICATIONS

Itoh et al. Chem. Abst. Vol. 71, No. 81489g (1969, Oct. 27, 1969) QD1.A51
Musinu et al. Chem. Abst. Vol. 70, No. 55930d (1969). QD1.A51
Shibata Rubber Chem. Abst. Vol. 67, No. 82717j (1967). QD1.A51

*Primary Examiner*—Natalie Trousof
*Attorney*—Jacobs & Jacobs

[57] ABSTRACT

Imidazolines having hypotensive and/or anti-inflammatory activity are described. They have the formula:

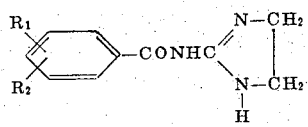

wherein $R_1$ and $R_2$ are the same or different and each is hydrogen, halogen, lower alkyl or lower alkoxy. An imidazoline having hypotensive activity is 2-benzamido-2-imidazoline, an anti-inflammatory imidazoline is 2,4-dichlorobenzamido-2-imidazoline. The new imidazolines are prepared from ethylenediamine and a pseudothiourea or acid addition salt of the formula:

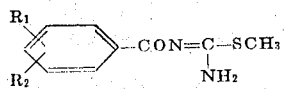

2 Claims, No Drawings

BENZAMIDOIMIDAZOLINES

This invention relates to novel imidazolines which have hypotensive and/or anti-inflammatory activity.

The present invention provides an imidazoline of formula (I)

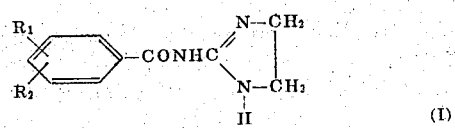

wherein $R_1$ and $R_2$ are the same or different and each is hydrogen, halogen, lower alkyl or lower alkoxy.

In the present specification the terms "lower alkyl" and "lower alkoxy" refer to alkyl and alkoxy groups having from one to four carbon atoms.

By way of example $R_1$ and $R_2$ may be chloro-, methyl-, or methoxy groups.

This invention also provides a process for the preparation of compounds of formula (I), which process comprises reacting a pseudothiourea of formula (II), preferably in the form of an acid addition salt,

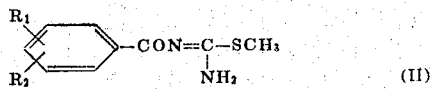

with ethylenediamine.

Compounds of formula (II) may be prepared by reacting an acid chloride (III)

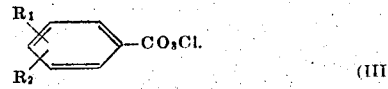

with either (a) ammonium thiocyanate followed by ammonia or (b) thiourea, thereby forming a benzoylthiourea (IV)

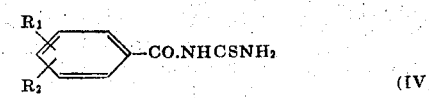

and then reacting said benzoylthiourea (IV) with a methylating agent. In formulas (II) — (IV) $R_1$ and $R_2$ have the same significance as in formula (I).

When the methylating agent employed is a methyl halide such as methyl iodide, the halide salt e.g. iodide, of compounds (II) is formed directly.

One preferred compound of this invention which on testing in small animals has shown significant hypotensive activity is 2-benzamido-2-imidazoline. One preferred compound which on testing in small animals has shown significant anti-inflammatory activity is 2,4-dichlorobenzamido-2-imidazoline.

The present invention also provides a pharmaceutical composition comprising a compound of formula (I) together with conventional liquid or solid pharmaceutical carriers or excipients. The compounds and compositions of this invention can be administered either orally or parenterally.

The following Examples describe the preparation of some specific compounds of this invention.

EXAMPLE 1

Benzoyl chloride (28.10 g.) was added dropwise to a suspension of ammonium thiocyanate (15.20 g.) in acetone (100 ml) at room temperature. The reaction mixture was warmed on a water bath for 5 minutes. Excess 5N ammonium hydroxide solution (500 ml.) was added in one portion and the mixture was heated under reflux for 5 minutes. The resulting solution was poured into distilled water (2 L) to give N-benzoylthiourea (26.67 g.; 75 percent) as colorless microcrystals, m.p. 171° – 172°C.

N-Benzoylthiourea (18.00 g.) was dissolved in the minimum volume of acetone, treated with excess methyl iodide, and allowed to stand at room temperature overnight. The resulting colorless crystalline precipitate of N-benzoyl-S-methylpseudothiouronium iodide (31.00 g.; 97 percent) m.p. 185°C was filtered and washed with cold acetone. (Found: C, 33.97; H, 3.48; N 8.68; S, 9.77 percent; $C_9H_{11}IN_2OS$ requires: C, 33.55; H, 3.41; N, 8.70; S, 9.94 percent).

N-Benzoyl-S-methylpseudothiouronium iodide (1.04 g.) methanol (10 ml.) was added to anhydrous ethylenediamine (0.20 g.) in methanol (5 ml.) and the mixture was allowed to stand at room temperature. After 7 days the resulting colorless needles of 2-benzamido-2'-imidazoline (0.48 g.; 78 percent) m.p. 184° – 187°C were filtered and washed with methanol (10 ml.). (Found: C, 63.29; H, 5.92; N, 22.24 percent; $C_{10}H_{11}N_3O$ requires: C, 63.50; H, 5.82; N, 22.20 percent).

EXAMPLE 2 o-Chlorobenzoyl chloride (17.50 g.) and thiourea (7.60 g.) were dissolved in toluene (150 ml.) and heated under reflux for 18 hours with vigorous stirring. After cooling the resulting precipitate was filtered and recrystallized from toluene to give N-o-chlorobenzoylthiourea (6.74 g.; 31 percent) m.p. 164° – 165°C. (Found: C, 44.80; H, 3.24; N, 13.10; S, 14.95; Cl, 16.53 percent; $C_8H_7ClN_2OS$ requires: C, 44.75; H, 3.26; N, 13.25; S, 14.80, Cl, 16.32 percent).

N-o-Chlorobenzoylthiourea (4.80 g. ) was dissolved in the minimum volume of acetone, treated with excess methyl iodide, and allowed to stand at room temperature overnight. The resulting colorless crystalline precipitate of N-o-chlorobenzoyl-S-methylpseudothiouronium iodide (6.67 g.; 84 percent) m.p. 179° – 180°C was filtered and washed with cold acetone (Found: C 30.27; H, 2.80; N, 7.73; S, 8.87 percent: $C_9H_{10}ClIN_2OS$ requires: C, 30.30; H, 2.82; N, 7.85; S, 8.98 percent).

N-o-Chlorobenzoyl-S-methylpseudothiouronium iodide (6.67 g.) was dissolved in the minimum of methanol, and the solution was added to anhydrous ethylenediamine (0.94 g.) in methanol (12 ml.). The reaction mixture was allowed to stand at room temperature for 3 days. The resulting precipitate was filtered and recrystallized from water to give 2-o-chlorobenzamido-2-imidazoline (1.94 g.; 24%) as colorless micro-crystals m.p. 228° – 229°C.

(Found: C, 53.43; H, 4.59; N, 18.59; Cl, 15.93 percent; $C_{10}H_{10}ClN_3O$ requires: C, 53.75; H, 4.48; N, 18.65; Cl, 15.90 percent).

EXAMPLE 3 o-Toluoyl chloride (10.00 g.) and thiourea (4.92 g.) were dissolved in toluene (100 ml.) and heated under reflux for 18 hours with vigorous stirring. After cooling the resulting precipitant was filtered and recrystallized from toluene to give N-o-toluoylthiourea (5.00 g.; 41 percent) as colorless microcrystals m.p. 185°C (Found: C, 55.43; H, 5.15; N, 14.39; S, 16.41 percent; $C_9H_{10}N_2OS$ requires C, 55.62; H, 5.16; N, 14.44, S, 16.50 percent).

N-o-Toluoylthiourea (1.94 g.) was dissolved in the minimum volume of acetone treated with excess methyl iodide, and allowed to stand at room temperature overnight. The resulting colorless precipitant of S-methyl-N-o-toluoylpseudothiouronium iodide (2.24 g.; 66 percent) m.p. 157° – 158°C was filtered and washed with cold acetone (Found: C, 35.54; H, 3.86; N, 8.10; S, 9.67 percent; $C_{10}H_{13}IN_2OS$ requires: C, 35.70; H, 3.86; N, 8.34; S, 9.52 percent).

S-Methyl-N-o-toluoylpseudothiouronium iodide (7.58 g.) in methanol (20 ml.) was added to anhydrous ethylenediamine (1.35 g) in methanol (5 ml.). The resulting solution was heated under reflux for 1 hour and was then allowed to cool and stand at room temperature for 3 days. The resulting crystalline precipitate was filtered and recrystallized from aqueous methanol to give 2-o-toluamido-2-imidazoline (1.41 g.; 35 percent as colorless microcrystals m.p. 158° – 159°C (Found: C, 65.02; H, 6.42; N, 20.04 percent; $C_{11}H_{13}N_3O$ requires: C, 65.00; H, 6.40; N, 20.68 percent).

EXAMPLE 4 p-Anisoyl chloride (17.05 g.) was added dropwise to a suspension of ammonium thiocyanate (7.60 g.) in acetone (50 ml.) at room temperature. The reaction mixture was warmed on a water bath for 5 minutes.

Excess 5N ammonium hydroxide solution (90 ml.) was added in one portion and the mixture was heated under reflux for 5 minutes. The resulting solution was poured into distilled water (1L) to give N-p-anisoylthiourea (16.24 g.; 77 percent) as colorless microcrystals m.p. 210° – 212°C (Found: C, 51.44; H, 4.81; N, 13.24; S, 14.08 percent; $C_9H_{10}N_2O_2S$ requires: C, 51.12; H, 5.21; N, 13.27; S, 15.16 percent).

N-p-Anisoylthiourea (8.00 g.) was dissolved in the minimum volume of acetone, treated with excess methyl iodide and allowed to stand at room temperature overnight. The resulting precipitant was filtered and washed with cold acetone to give N-p-anisoyl-S-methylpseudothiouronium iodide (9.02 g., 68 percent) as colorless microcrystals m.p. 174° – 178°C. (Found: C, 34.40; H, 3.76; N, 7.84; S, 9.10; I, 36.04 percent; $C_{10}H_{13}IN_2O_2S$ requires C, 34.50; H, 3.70; N, 7.95; S, 9.09; I, 36.08 percent).

A suspension of N-p-anisoyl-S-methylpseudothiouronium iodide (9.09 g.) in methanol (50 ml.) was added to anhydrous ethylenediamine (1.54 g.) in methanol (10 ml.) and the resulting clear solution allowed to stand at room temperature for 3 days. Addition of water (100 ml.) yielded a colorless precipitate which was filtered and recrystallized from water to give 2-p-anisamido-2-imidazoline (0.93 g.; 17%) as pale-yellow microcrystals m.p. 172° – 174°C (Found: C, 60.28; H, 6.03; N, 19.25 percent; $C_{11}H_{13}N_3O_2$ requires: C, 60.25; H, 5.93; N, 19.18 percent.

EXAMPLE 5

2-5-Dimethoxybenzoyl chloride (4.75 g.) was dissolved in a minimum amount of acetone and added dropwise to a solution of ammonium thiocyanate (1.81 g.). The reaction mixture was warmed on a water bath for 5 minutes. Excess 5N ammonium hydroxide (7 ml.) was added dropwise and the mixture was heated under reflux for a further 5 minutes. The reaction mixture was then poured into distilled water (600 ml.). The resulting crystalline precipitate was filtered, dried in vacuo and recrystallized from toluene to give N-(2-6-dimethoxybenzoyl)thiourea (1.84 g.; 31 percent) as pale yellow microcrystals m.p. 236° – 238°C (Found: C, 50.10; H, 5.03; N, 11.49; S,13.58 percent; $C_{10}H_{12}N_2O_3S$ requires: C, 50.00; H, 5.00; N, 11.68; S, 13.32 percent).

N-(2.6-Dimethoxybenzoyl)thiourea (3.57 g.) was dissolved in a minimum of dry acetone (350 ml.) and treated with excess methyl iodide (4.35 g.). The reaction mixture was allowed to stand at room temperature for 18 hours and then heated under reflux for half an hour. The resulting crystalline precipitate was filtered and dried in vacuo. Further crops were obtained by evaporation of the mother liquors. The combined precipitates were recrystallized from ethanol ether to yield N-(2-6-dimethoxybenzoyl-S-methylpseudothiouronium iodide) (3.72 g.; 65 percent as colorless microcrystals m.p. 178°–182°C (Found: C, 34.65; H, 3.98; N, 7.25; S, 8.39; I, 33.37 percent; $C_{11}H_{15}IN_2O_3S$ requires, C, 34.60; H, 3.93; N, 7.35; S, 8.40; I, 33.80 percent).

N-(2-6-Dimethoxybenzoyl-S-methylpseudothiouronium iodide (4.36 g.) in methanol (30 ml.) was added dropwise at room temperature to anhydrous ethylenediamine (0.69 g.) in methanol (20 ml.) and allowed to stand at room temperature for 7 days. The resulting precipitate was filtered, washed with water (30 ml.) and dried in vacuo to yield 2-6-dimethoxybenzamido-2-imidazoline (1.45 g.; 51 percent) as colorless microcrystals m.p. 264°C (Found: C, 57.34; H, 6.05; N, 16.78 percent; $C_{12}H_{15}N_3O_3$ requires C, 57.85; H, 6.03; N, 16.86 percent).

EXAMPLE 6

2-4-Dichlorobenzoyl chloride (84.00 g.) was added dropwise to thiourea (30.40 g.) in toluene (1,200 ml.) and the reaction mixture heated under reflux with stirring for 18 hours. The hot reaction mixture was filtered and allowed to cool. The resulting crystalline precipitate was filtered and recrystallized further from toluene to yield N-(2,4-dichlorobenzoyl) thiourea (46.17 g.; 45 percent) as pale yellow microcrystals m.p. 161° – 162°C (Found: C, 38.41; H, 2.45; N, 11.35; S, 12.61 percent; $C_8H_6Cl_2N_2OS$ requires C, 38.60; H, 2.41; N, 11.25, S, 12.87 percent).

N-(2-4-dichlorobenzoyl)thiourea (5.00 g.) was dissolved in a minimum amount of acetone and treated with excess methyl iodide (5.0 g.). The reaction mixture was heated under reflux for 1 hour on a water bath, treated with an equal volume of dry ether and allowed to cool. The resulting precipitate was filtered, washed with dry ether and dried in vacuo to give N-(2,4-dichlorobenzoyl)-S-methylpseudothiouronium iodide (6.38 g.; 80 percent) as colorless microcrystals m.p. 139°C (Found: C, 27.72; H, 2.21; N, 7.16; S, 8.20 percent; $C_8H_6Cl_2IN_2OS$ requires C, 27.60; H, 2.30; N, 7.15; S, 8.18 percent).

N-(2,4-Dichlorobenzoyl)-S-methylpseudothiouronium iodide (20.00 g.) in methanol (45 ml.) was added to anhydrous ethylenediamine (3.10 g.) in methanol (20 ml.). The reaction mixture was allowed to stand at room temperature for 4 days. The resulting precipitate was filtered, washed with methanol and water and dried in vacuo to give 2,4-dichlorobenzamido-2-imidazoline (8.67 g.; 66 percent) as colorless microcrystals m.p. 229° – 231°C (Found: C, 46.58; H, 3.44; N, 16.36; Cl, 27.45 percent; $C_{10}H_9Cl_2N_3O$ requires C, 46.42; H, 3.49; N, 16.26; Cl, 27.52 percent).

EXAMPLE 7

2-6-Dichlorobenzoyl chloride (5.0 g.) and thiourea (1.81 g.) were dissolved in toluene (100 ml.) and heated under reflux with stirring for 48 hours. The hot solution was filtered and allowed to cool. The resulting precipitate was filtered, washed with toluene and dried in vacuo to give N-(2,6-dichlorobenzoyl)thiourea (2.56 g.; 43 percent) as pale yellow microcrystals m.p. 220° – 222°C (Found: C, 38.60; H, 2.36; N, 11.09; S, 12.89 percent; $C_8H_6Cl_2N_2OS$ requires C, 38.70; H, 2.41; N, 11.25; S, 12.85 percent).

N-(2,6-dichlorobenzoyl)thiourea (2.83 g.) was dissolved in dry acetone (25 ml.) and treated with excess methyl iodide (10.0 g.). The resulting solution was heated under reflux for 2 hours. The reaction mixture was then concentrated in vacuo to about 5 ml. and treated with dry ether. The supernatant liquors were decanted from the resulting gum, which was dissolved in methanol (30 ml.). This methanolic solution of crude N-(2,6-dichlorobenzoyl)-S-methylpseudothiouronium iodide was added dropwise to a solution of ethylenediamine (0.69 g.) in methanol (5 ml.) at room temperature. The resulting crystalline precipitate (2.08 g.) was filtered, washed with a little methanol and dried in vacuo. Recrystallization from dimethyl sulphoxide/water followed by filtration through a column of silica gel G with chloroform as eluent and finally recrystallization from dimethyl sulphoxide/water gave a chromatographically pure sample of 2,6-dichlorobenzamido-2-imidazoline (0.54 g.) as off-white microcrystals m.p. 279°–280°C (Found: C, 47.12; H, 3.52; N, 15.65; Cl, 26.34 percent; $C_{10}H_9N_3Cl_2O$ requires C, 46.54; H, 3.49; N, 16.27; Cl, 27.52 percent).

We claim:
1. 2-Benzamido-2-imidazoline.
2. 2,4-dichlorobenzamido-2-imidazoline.

* * * * *